United States Patent [19]
Hardy

[11] 3,886,891
[45] June 3, 1975

[54] WORK HOLDER WITH FLUID PURGE MEANS

[75] Inventor: Donald F. Hardy, Horseheads, N.Y.

[73] Assignee: Dart Industries Inc., Los Angeles, Calif.

[22] Filed: June 28, 1973

[21] Appl. No.: 374,298

Related U.S. Application Data

[63] Continuation-in-part of Ser. Nos. 232,455, March 7, 1972, and Ser. No. 232,413, March 7, 1972, Pat. No. 3,765,712.

[52] U.S. Cl. .................. 118/1; 118/58; 118/69; 118/DIG. 5; 269/25; 294/87.26
[51] Int. Cl. .......................................... B05c 11/14
[58] Field of Search .............. 118/1, 2, 4, 8, 503; 279/44, 66, 1 R, 1 ME, 1 SG; 269/25, 34, 35, 56, 86, 270, 153, 140, 142, 287; 294/87.26, 87 R; 214/309, 1 B, 1 BB

[56] References Cited
UNITED STATES PATENTS

| | | | |
|---|---|---|---|
| 1,443,415 | 1/1923 | Jolls | 279/1 M |
| 1,724,336 | 8/1929 | Ayers | 118/503 UX |
| 2,415,520 | 2/1947 | Obecny | 269/25 |
| 3,457,899 | 7/1969 | Kelch et al. | 118/503 |
| 3,595,109 | 7/1971 | Burroughs et al. | 279/1 X |

*Primary Examiner*—Morris Kaplan

[57] ABSTRACT

A glassware coating process and apparatus including ware handling, heating, coating and transfer equipment that is continuously operable to apply a coating of thermoplastic polymer resin to the exterior surface of the ware. A split chuck has reciprocable ware holding elements which are actuated through a ware sensor. Fluid purge means are incorporated in the chuck whereby to inhibit deposition thereon upon immersion into a fluidized bed of the coating resin. Similarly, the invention incorporates a ware orientation device that accurately aligns the ware immediately prior to the seizure thereof by the clamping mechanism.

14 Claims, 13 Drawing Figures

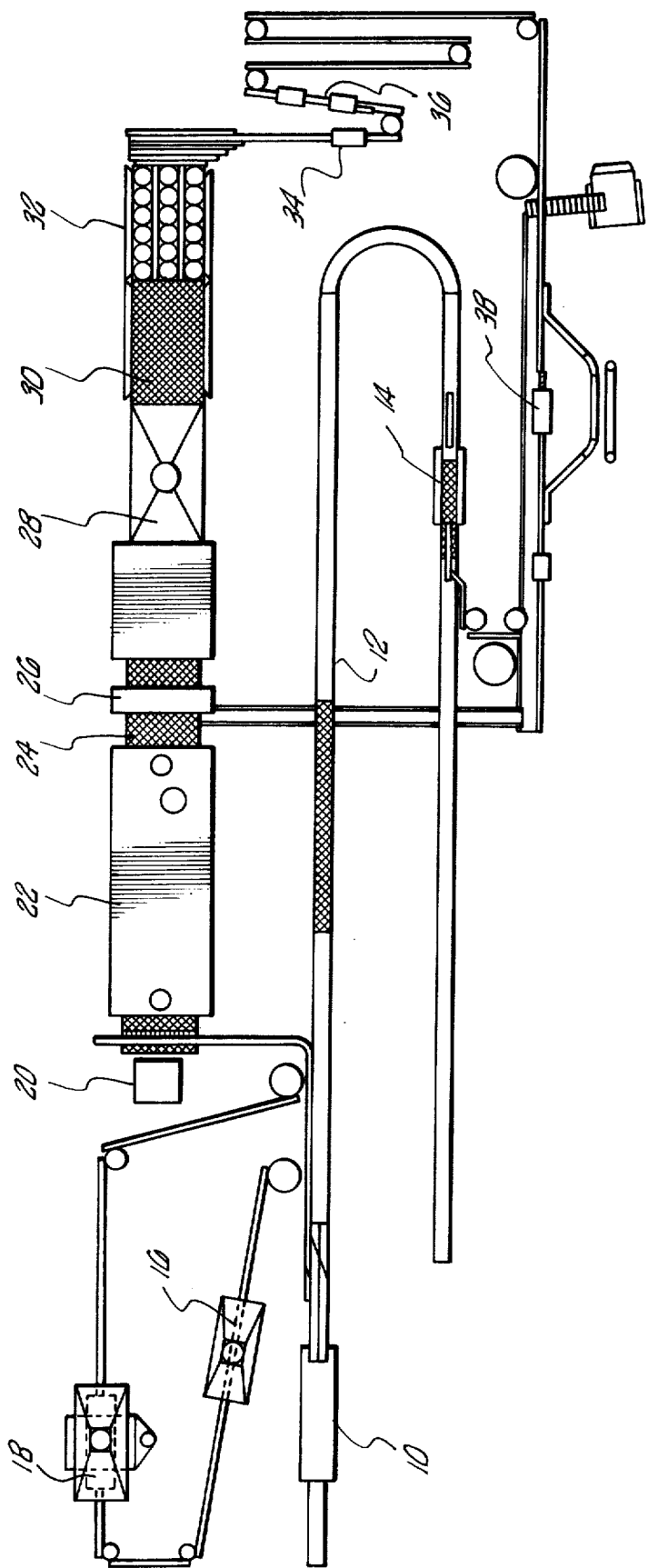
FIG.—1

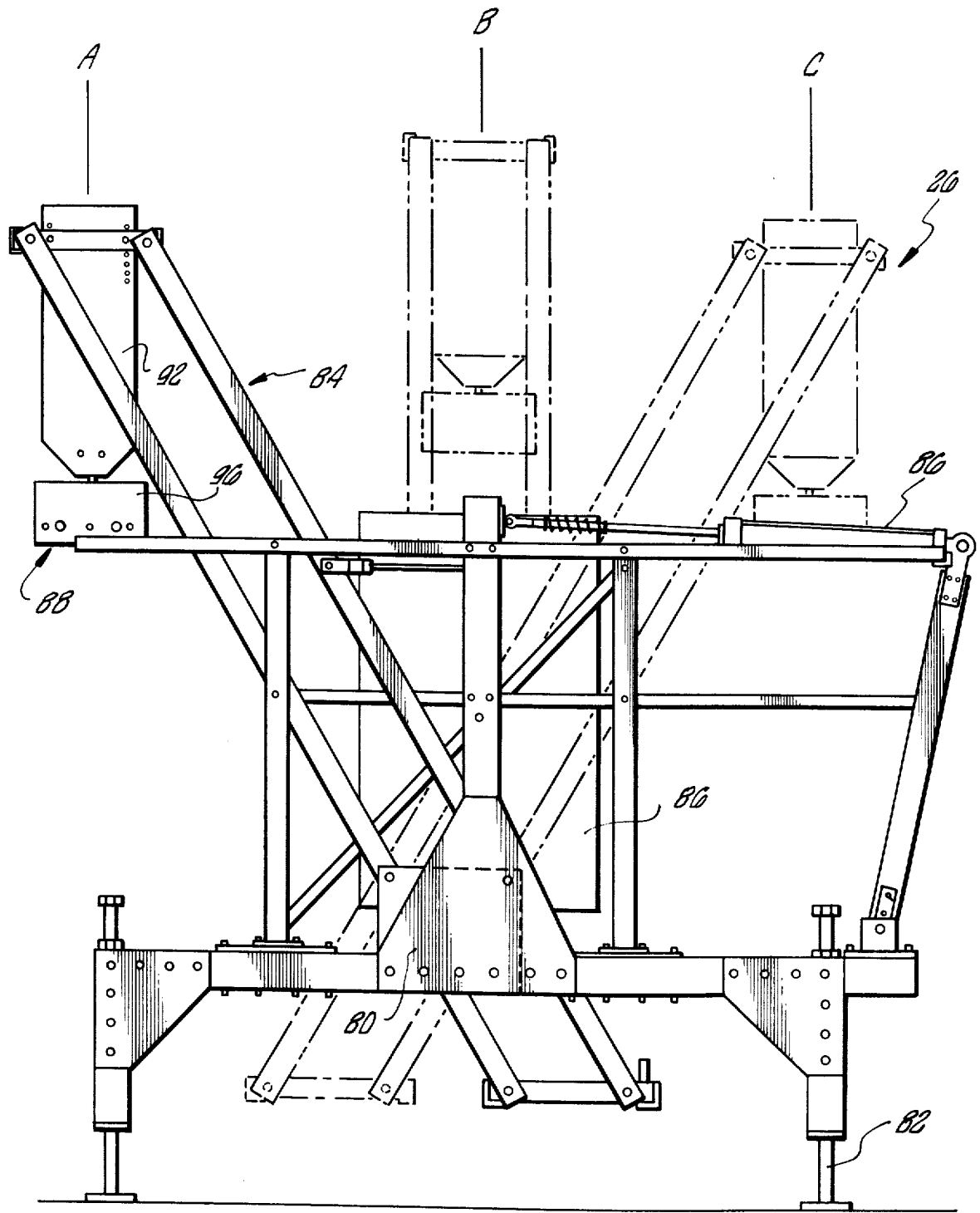
FIG.—2

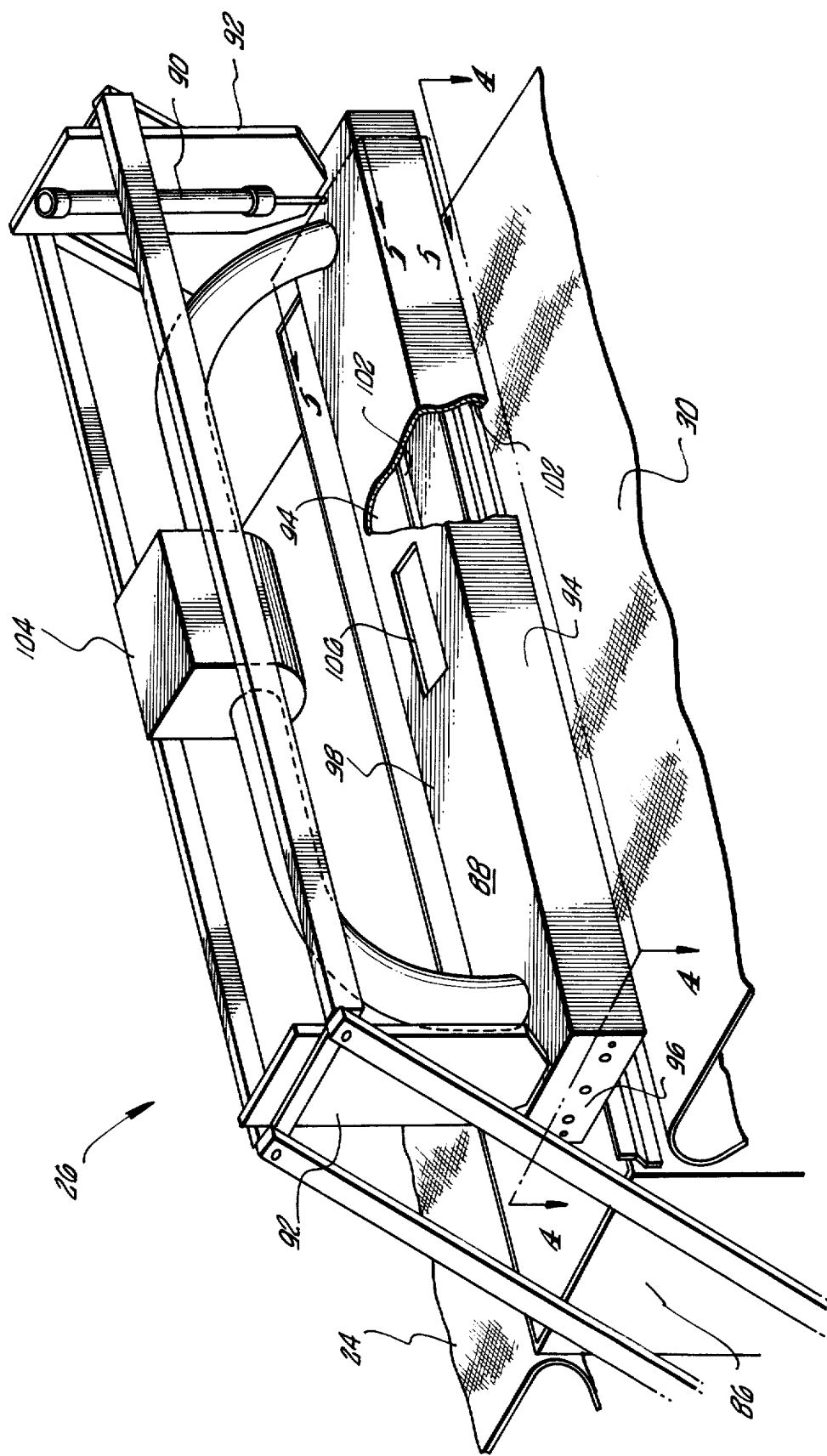
FIG.—3

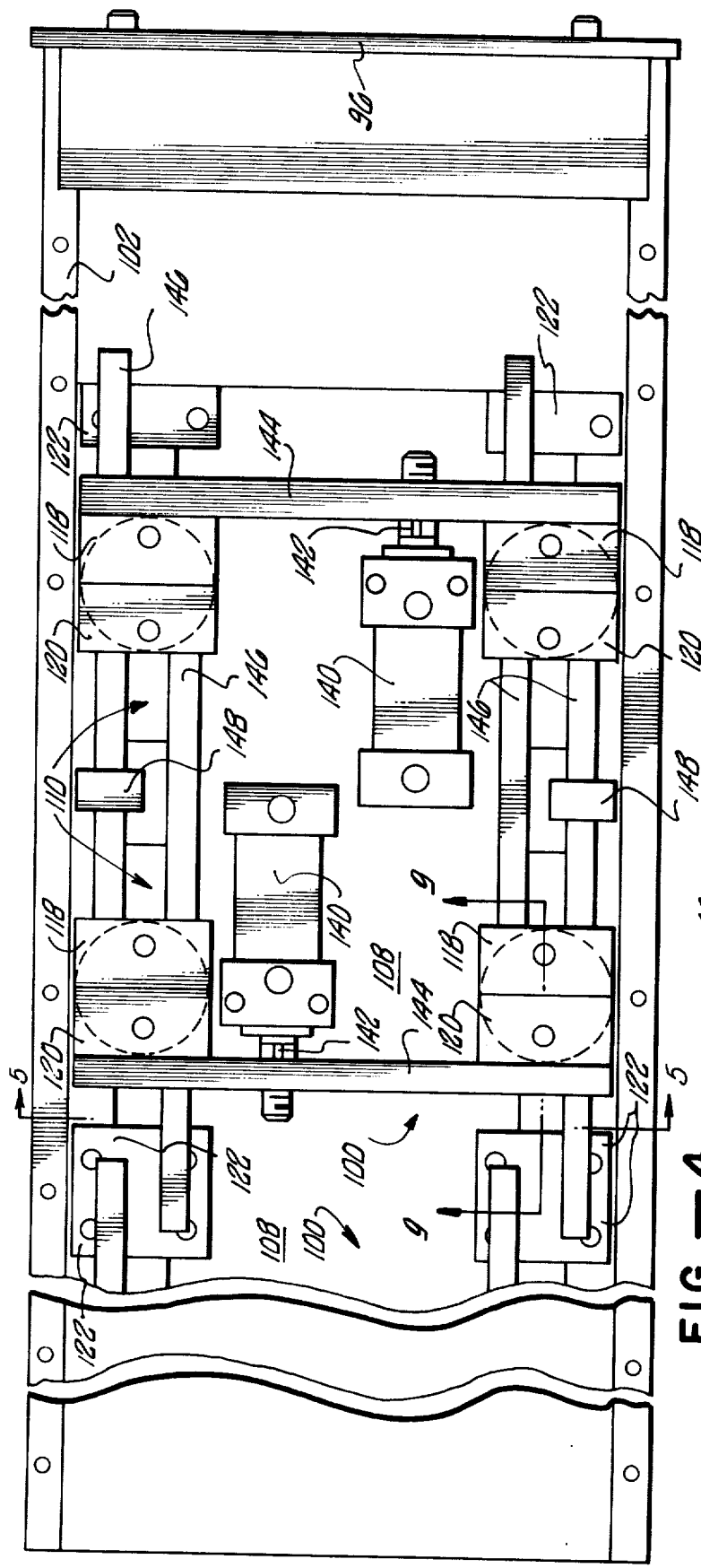
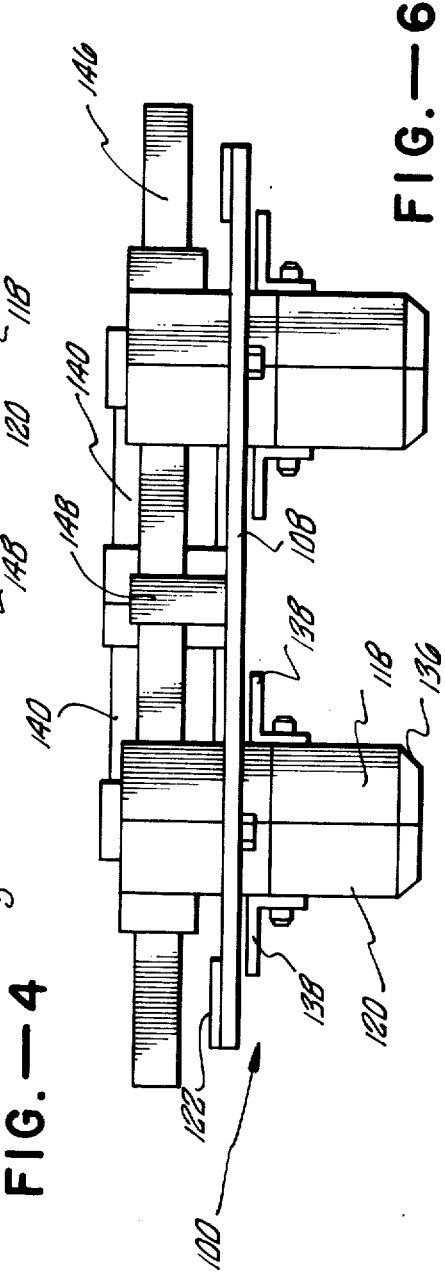
FIG.—4
FIG.—6

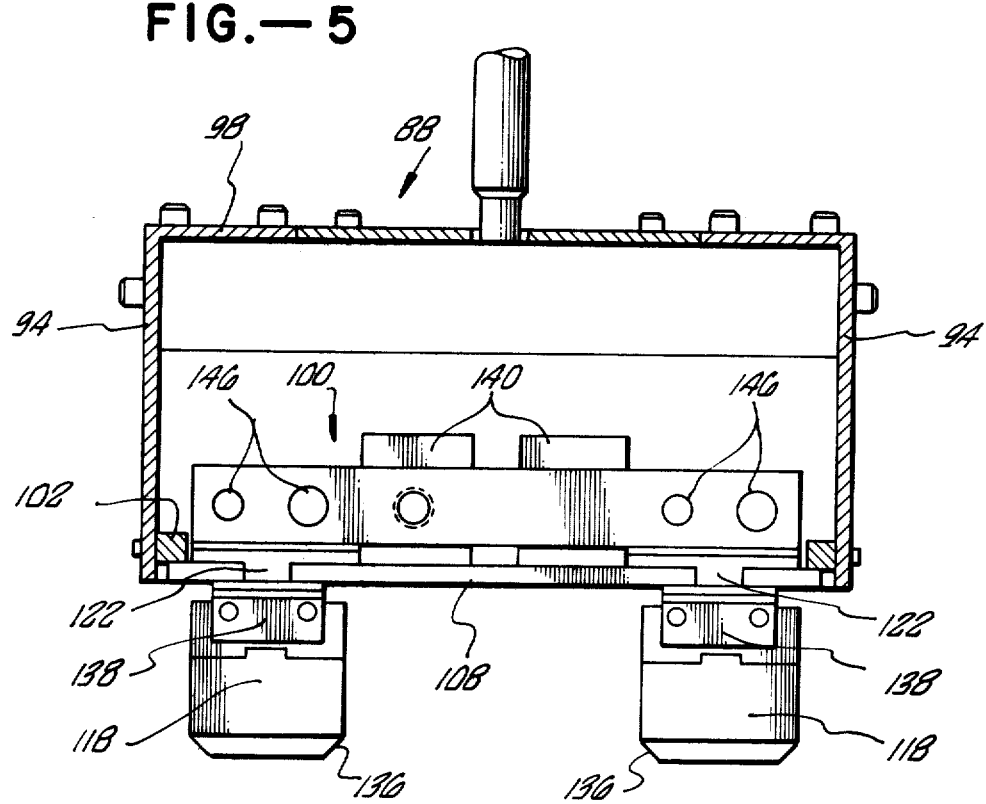
FIG.—5
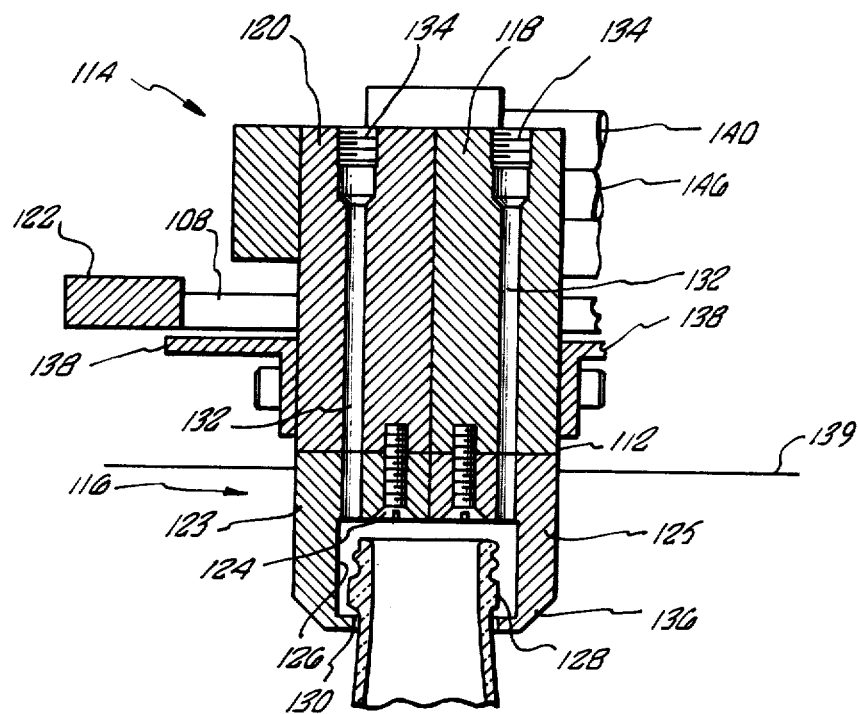
FIG.—9

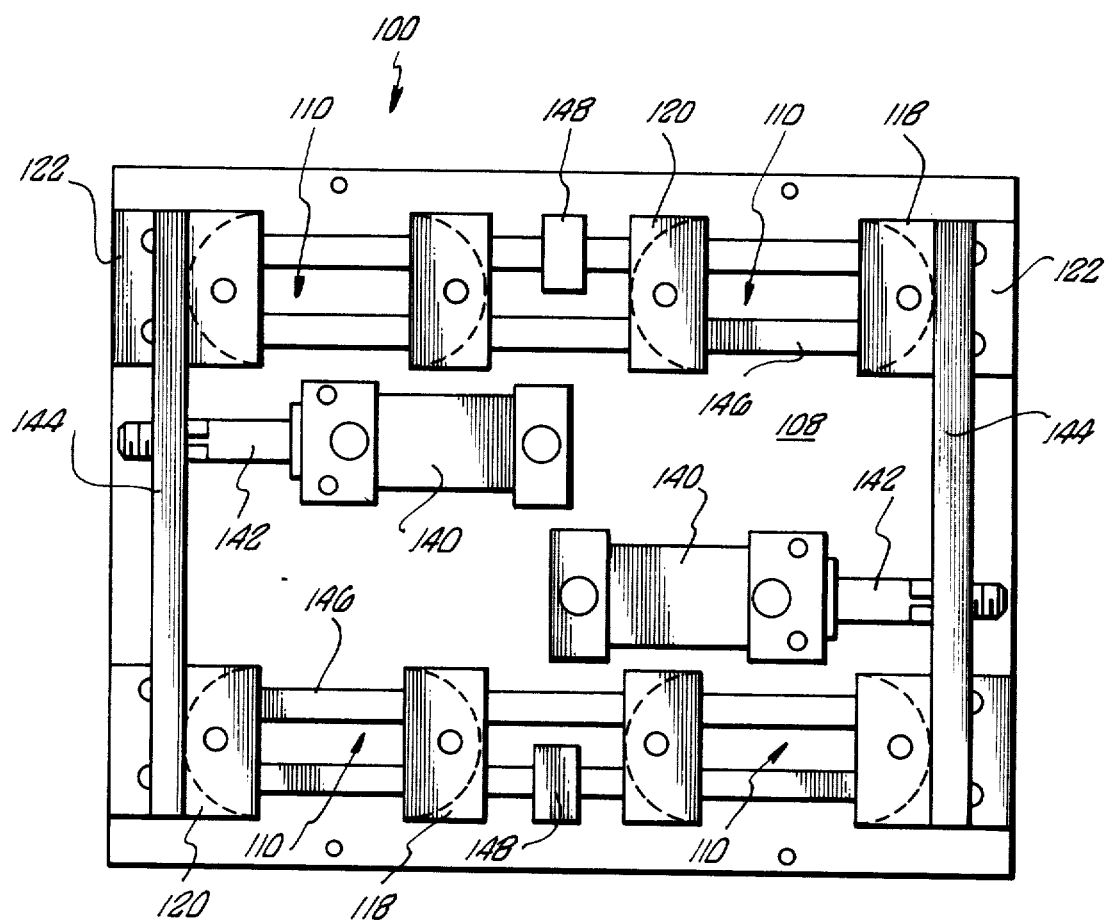
FIG.—7
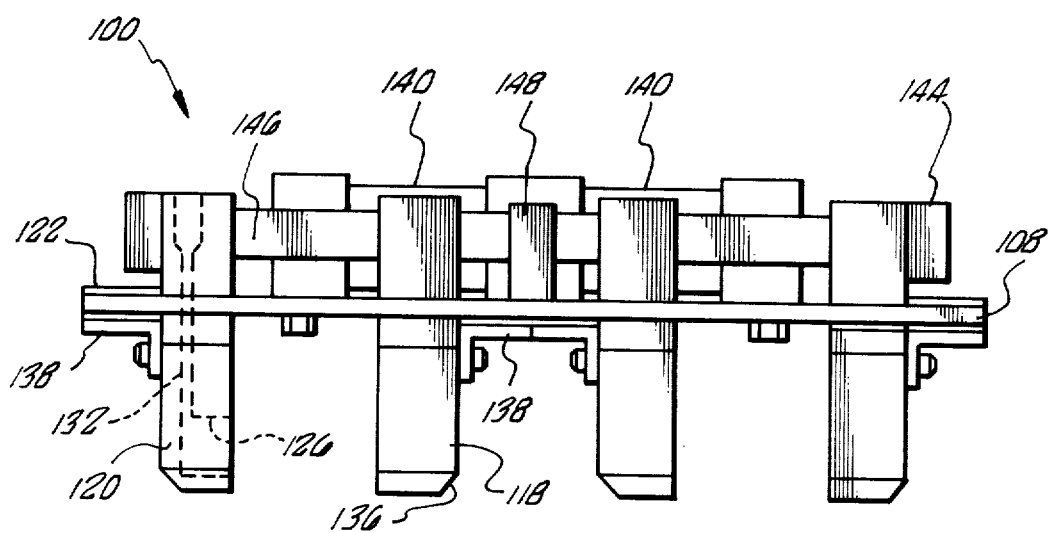
FIG.—8

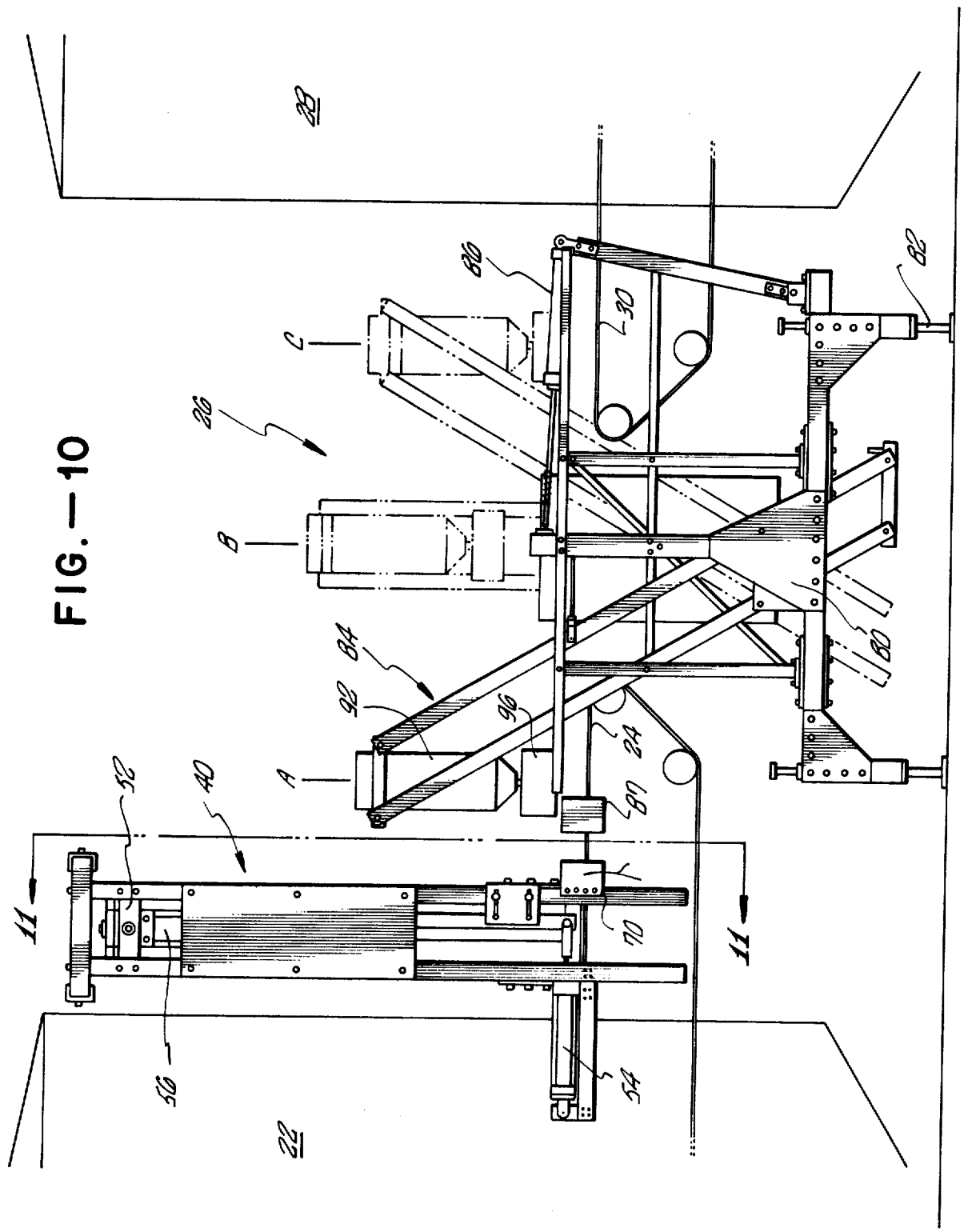

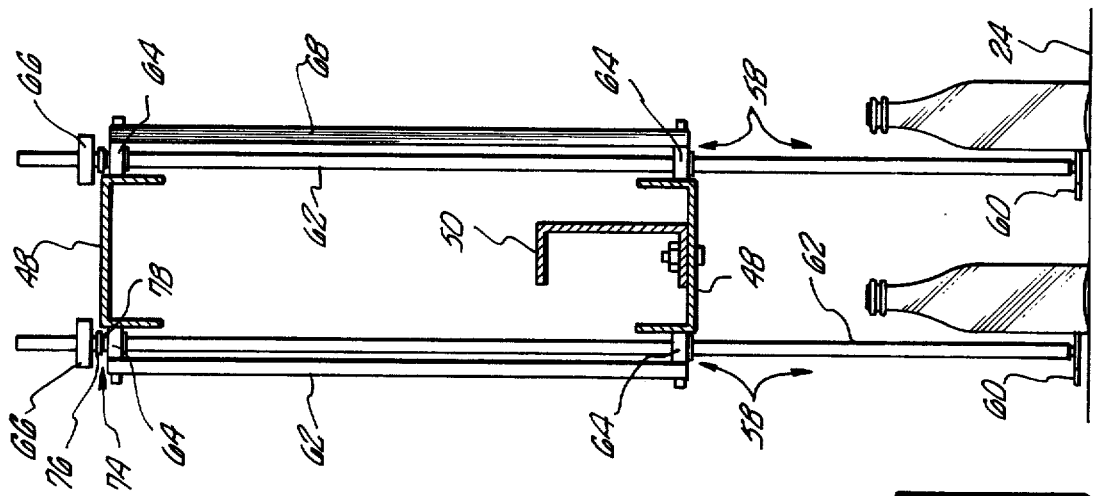
FIG.-12
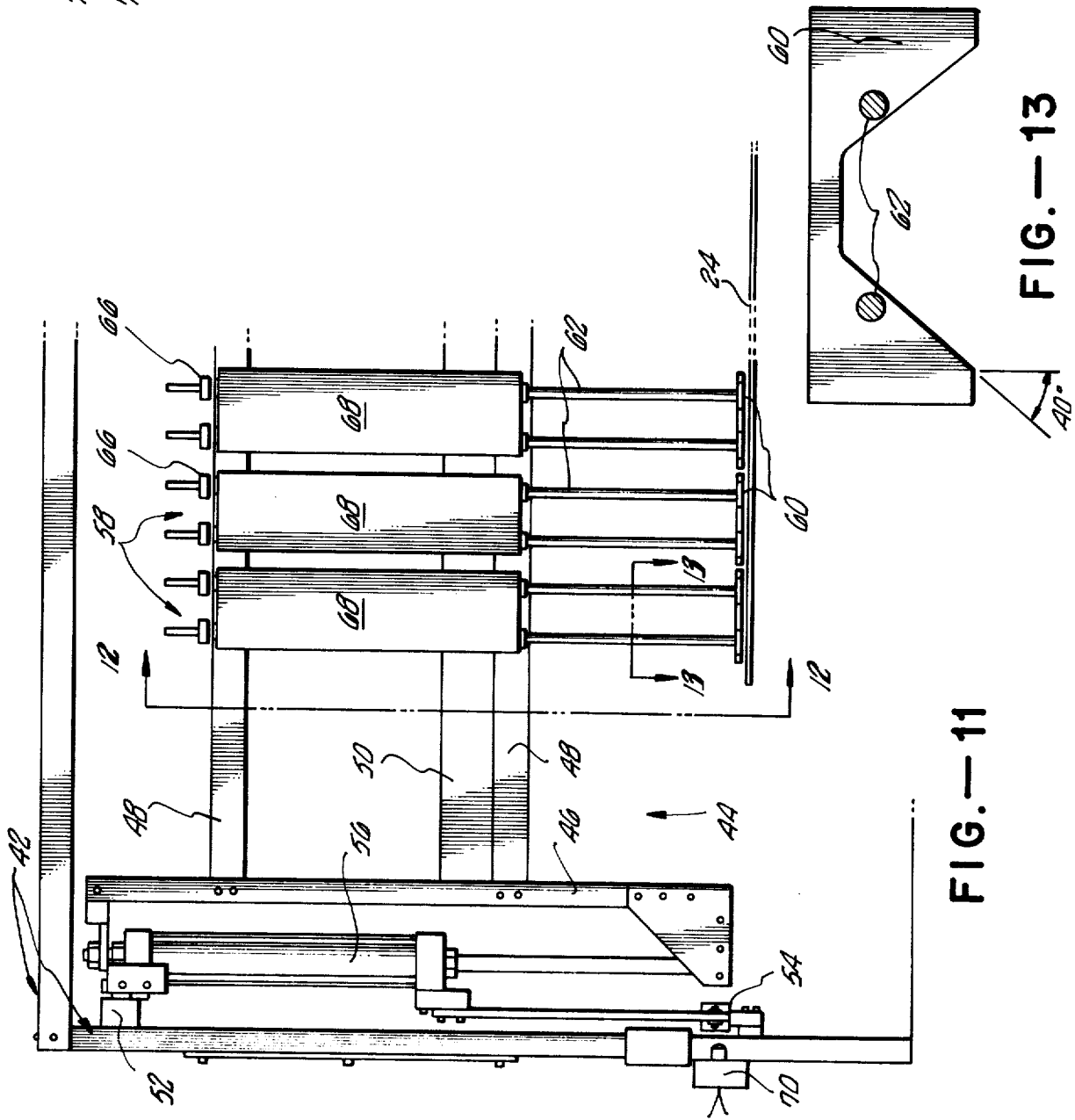
FIG.-13
FIG.-11

WORK HOLDER WITH FLUID PURGE MEANS

CROSS-REFERENCE TO RELATED APPLICATIONS

This is a continuation-in-part of my earlier filings entitled, Glassware Coating Apparatus and Process Therefor, Ser. No. 232,455, filed Mar. 7, 1972, and Transfer Mechanism Gripping Device, Ser. No. 232,413, filed Mar. 7, 1972, now U.S. Pat. No. 3,765,712.

This invention relates to an improved apparatus for coating articles of manufacture and more particularly concerns the production of shatter-resistant glassware (i.e., bottleware). In conjunction herewith, developments that might more broadly be characterized as article orientation and transfer related are described in combination with conventional fluidized bed apparatus and oven constructions.

It should be understood that prior art polymer coatings and techniques for the application of same to glassware, and in particular bottles, have long been known and practiced in the industry. These coatings have, however, been employed, for the most part, to protect the basic glass construction from surface abrasions and the like. Such abrasions or other defects substantially reduce the inherent glass strength and therefore obviously subject it to a higher incidence of failure.

The coatings referred to have taken the form of thin protective films bonded to the glass surface and in most respects exhibit tough but brittle characteristics. These have served well in providing the intended protection in preserving glassware integrity. However, such cannot and do not render ware "shatter-resistant" or substantially change the fragmentation characteristics of ware that is broken while under internal pressure.

In the latter respect, it should also be recognized that certain glassware, particularly glass aerosol containers, have been provided with polymeric protective sheaths. These are indicated to be resistive to glass fragmentation under conditions of failure but such have been inapplicable for use in the vast majority of glassware applications. For example, most such coatings are of thicknesses which economically prevent their use or adoption in many fields. Likewise, these have not exhibited criteria which would enable their use in bottling applications where severe cleaning and other processing techniques dictated by the contained product are encountered.

The application here considered has therefore been directed primarily to those containerization areas employing internal pressurization where known aerosol bottle coating techniques are inapplicable. These are principally considered to be carbonated beverage bottles and the like which, of course, due to their pressurized state, are subject to severe fragmentation in certain instances of failure. In reiteration, it should be understood that the film coatings first mentioned above help in reducing the incidence of failure here discussed but under conditions of failure will not necessarily decrease the severity of fragmentation.

Techniques and apparatus for the application of coatings to containers as are here disclosed establish that certain adhesive characteristics between the glass and polymer envelope dictate the acceptability and applicability for creation of the shatter-resistant container desired. Similarly, other polymer properties such as elasticity, toughness, etc., contribute to the overall effectiveness of the coating in producing the shatter-resistant container. Likewise, processing during coating contributes significantly to the creation of a suitably adherent polymer sheath having surface texture continuity and transparency acceptable to the bottling trade.

The invention contemplates use of thermoplastic polymers as the shatter-resistant coating, for example polyethylene polymers and copolymers such as those described in copending applications Ser. Nos. 232,516; 232,517; and 232,384 all filed on Mar. 7, 1972 and each application now abandoned, have been found to be quite satisfactory for use in the process. The coating process employing such particulate resins dictates that careful controls on glassware preheat and curing temperatures, immersion times and the like be maintained to assure production of a properly adherent coating. It is also preferred that the polymer coating be applied to the ware using fluidized bed techniques which, in conjunction with the heating, etc., referred to may be operated as a continuous line, optionally in concert with typical bottle forming machinery.

In addition, particular apparatus developments and improvements have also contributed to the success of the overall process and coated shatter-resistant bottle product. Unique ware orientation and an improved chuck assembly are employed to present the ware to the coating medium. Further, and in conjunction with the chuck assembly employed during actual particulate polymer coating, improved clamping mechanisms are employed. These are adapted to grip a plurality of heated ware simultaneously, hold the ware firmly in a steady upright position through all motions of the transfer apparatus upon which same are mounted, and to be immersible within a fluidized bed of thermoplastic polymer resin during apparatus movement without the adherence or an accumulation of resin thereto.

Prior clamping devices used in conjunction with apparatus of this type, such as those disclosed in my above-referenced related applications, have adapted for positioning in close proximity only with the fluidized bed surface. Accordingly, the degree of bottle immersion was dependent upon the bed surface characteristics around each such bottle. These characteristics as might be anticipated were somewhat inconsistent and therefore the coating parting line varied slightly from bottle to bottle. Furthermore, such techniques resulted in a glass exposure in the bottle neck area that is preferably covered.

The chuck assembly and in particular, the clamping mechanisms supported thereon are constructed so as to wholly encapsulate the bottle finish and for immersion into the particle bed during the apparatus dip cycle. Immersion of the clamping mechanism is facilitated by a unique clamp cooling arrangement that cools each clamp member or jaw assembly continually and likewise serves as a purging means for the bottle interiors during dipping.

Hereinabove and throughout the specification and claims reference is made to a thermoplastic shatter-resistant coating. It should be understood that this terminology is employed in the same sense as would phraseology such as shatter proof or immune from substantial fragmentation. More particularly, this is a characteristic exhibited by the thermoplastic coated glassware that has been processed in the manner and by apparatus more fully described below. It is apparent therefore that the principal objective of the invention is the production of a shatter-resistant bottle suitable for use where internal bottle pressurization is anticipated and which by design and definition will substantially minimize bottle fragmentation in the event of such a pressurized bottle failure.

It should also be apparent that other significant advantages offered by coated bottles of this type include, for example, practical elimination of bottle-to-bottle contact glass abrasions, considerable reduction in bottling and filling line noise, and enable shipping carton redesign without partitions.

Additional objectives and advantages not enumerated will, however, also become more apparent upon continued reference to the specification, claims and drawing wherein:

FIG. 1 is a top plan view of typical bottle coating line as employs the immersible fluidized bed dipping apparatus;

FIG. 2 is a side elevational view of the fluidized bed dipping apparatus;

FIG. 3 is a partial perspective of the fluidized bed dipping assembly also partially broken away to expose the interior thereof;

FIG. 4 is a partial plan cross-sectional view of the dipping assembly taken along line 4—4 of FIG. 3 and which is broken away so as to expose only one of the plurality of chuck assemblies mounted thereto;

FIG. 5 is a partial elevational cross-sectional view of the dipper assembly taken along line 5—5 of FIG. 4 and also exposing an end elevation of a single chuck assembly;

FIG. 6 is a side elevational view of a chuck assembly in its closed position;

FIG. 7 is a top plan view of a chuck assembly in the open position;

FIG. 8 is a side elevational view of a chuck assembly in the open position;

FIG. 9 is an enlarged partial cross-sectional view of a clamping mechanism taken along line 9—9 in FIG. 4;

FIG. 10 is a side elevational view showing the fluidized bed dipping assembly and combined bottle orientation device;

FIG. 11 is a partial front elevational view of the bottle orientation device taken along line 11—11 of FIG. 10;

FIG. 12 is an end elevational cross section of a bottle pusher element taken along line 12—12 in FIG. 11; and FIG. 13 is a top cross-sectional view of a bottle orienter push plate taken along line 13—13 in FIG. 11.

As indicated above, the development of a shatter-resistant bottle demands that the polymeric resin employed possess several attributes including: adequate physical properties, feasibility of application to the substrate surface, and favorable environmental qualities. These applied resin coatings ideally are characterized by a high degree of toughness along with the capability of substantial elongation when subjected to sudden or instantaneous loading at both room and refrigerated temperatures. Likewise, to be effective in their performance under filling and breakage conditions, the resin should adhere to the glass substrate. The adhesive characteristic has been found to be of significance if an integral contiguous substrate/polymer coating relationship is to be maintained under hot filling, caustic washing and sterilization conditions. Similarly, under severe strain and upon failure, especially when under internal pressurization, the proper polymer qualities for adherence will assure the retention of glass fragments by the coating. If, however, adhesion is too great in many instances, the coating itself will fragment in a reaction similar to that of the glass substrate, and, if insufficient adhesion is achieved once the coating fails (i.e., splits or otherwise opens), glass fragments will be propelled through the opening, out and away from the polymer envelope.

Various polyethylene polymers, copolymers and the like will meet these criteria, and several preferred formulations are described in the identified copending applications. It should be recognized that other polymers may be similarly tailored for use in the process described and that variations in the polymer properties may be tolerated depending upon the desired resultant effect.

Referring now to FIG. 1, it will become apparent that the basic process steps for the application of this shatter-resistant coating to bottleware include a preheat cycle, a particulate coating application and a coating curing or fusing procedure. These basic steps as outlined have, of course, been employed in numerous coating applications, however, as applied to the shatterproofing of glassware several specific modifications thereof in the form of specific resin formulations and time/temperature relationships effect the desired end results. Likewise, it should also be apparent that the three basic steps may be expanded or incorporated with typical glass forming processes now practiced so that a newly formed bottle may proceed directly to and through the various required coating steps.

Further, in the event certain glass or resin compositions require, a priming step may be employed to achieve the desired degree of adhesion between these components. This, it should, however, be understood, is not contemplated as a required procedure in the preferred form of the invention. Various primers including silicone emulsions and chromic and polyacrylic solutions have been found to be effective in improving the bond between resin and glass.

Similarly, subsequent to curing, fusing or sintering the bottle coating, it may be desirable to apply a lubricant to the resin surface and/or to reheat the ware coating and thereafter quench same to improve the clarity thereof. Lubrication is, of course, intended to impart a slipperiness to the surface thereby reducing the coefficient of friction of the resinous material and enhancing the flow characteristics of the finished bottles during further handling. Several waxes have been found to be particularly effective and include those having a silicone-wax composition, carnuba waxes and silicones. In addition, it has been found that to effectively label polyethylene coated bottles the resin coating surface should be sensitized by flame treating means. A 1 to 5 second exposure is sufficient and thereafter labels may be applied using any of several glues including jelly-gums, casein glues and acetate adhesives.

The overall apparatus arrangement or combination used in effectuation of the indicated process include: (1) a bare bottle uncaser 10, a box conveyor 12 and a coated bottle caser 14; (2) a single line bottle primer pre-heat oven 16, a prime spray or coating unit 18 and a push-bar stacker 20; (3) a polymer coating preheat oven 22 and conveyor 24, a fluidized bed and bottle transfer or dipping mechanism 26, and curing oven 28 and conveyor 30; and (4) cooling section 32, waxer 34, flame sensitizer 36 and automatic inspection station 38.

In the instant process, the ware moves with the preheat wire mesh oven conveyor or conveying assembly 24 into and through the gas fired preheat oven 22. Within this oven the bottles are brought to a relatively uniform temperature of between about 400°F and 600°F which can be accomplished with about 12 minutes' exposure from a cold start. It should be appreciated though that various other oven types may require longer or shorter time exposures depending upon type and performance capabilities.

Immediately adjacent the terminal end of preheat oven 22, best seen in FIG. 10, is an article orientation mechanism 40 and the fluidized bed coating apparatus and transfer mechanism 26. The orientation mechanism 40 aligns the bottles both longitudinally and transversely of the path of travel of conveyor 24 and thereby prepositions same for engagement by the transfer apparatus.

In the preferred embodiment, it is contemplated that the bottle coating will be applied by consecutively dipping plural units of preheated ware into a fluidized bed of particulate resinous material as is above described. It is imperative that the preheated ware be firmly held in a steady state as they are inserted into the bed so that uniformity of coating can be maintained from bottle to bottle. Furthermore, it has been found that in order to provide a uniform coating parting line on the bottle necks it is a practical necessity to shield the bottle finish and immerse the shielding fixture along with the bottle into the fluid bed.

As alluded to above the parting line cut-off problem is created by the non-uniformity of the fluid bed surface during bottle immersion. However, immersion of the clamping assemblies creates additional problems hitherto considered insurmountable. For example, (1) the bottle finishes having to be completely shielded thus necessitating a very accurate bottle alignment so that upon clamp closing the bottle necks are properly centered between the jaw assemblies thereof; (2) the bottles being at elevated temperatures, between 400°F and 600°F, necessarily will conductively and convectively heat the clamping mechanisms thus also sensitizing them for acceptance of the polymer coating, an obviously unacceptable condition; and, (3) a purging medium or other protective means must be employed to assure the exclusion of polymer particles reaching the finish area or bottle interior without disturbing parting line uniformity.

This apparatus, more fully described hereinafter, incorporates a plurality of clamping mechanisms in an overhead chuck assembly that grasps the ware as it is moving with conveyor 24, initially moves that ware to a coating position and thereafter transports the coated ware to and deposits same on conveyor assembly 30.

The conveyor assembly 30, therefore, has deposited on it hot, exteriorly coated ware that is incompletely fused. Such conveyor thus passes through a fusing or curing zone or oven 28 (gas fired) and onto a circulating air cooling section or zone 32. Again, it should be appreciated that curing or fusing oven temperatures contribute significantly to the final product characteristics and that 450° to 600°F represents an acceptable temperature gradient. Preferably, however retention of the coated ware at a 450° to 475°F temperature level for a nominal 8 minute period produces ideal results. This may also vary depending upon oven construction and heat generation means. At the terminal end of conveyor 30 the coated ware is transferred into a single line configuration for passage through lubrication apparatus or waxer 34, on to the flame sensitizer 36 and through the inspection station 38.

A better appreciation of the several apparatus elements and improvements above-mentioned, may be obtained by reference to FIGS. 2–13. For example, the bottle or article orientation mechanism 40 may be seen in more detail in FIGS. 10–13. Such orienter, as is best seen in FIG. 10, extends across and above the conveyor 24 and is in relatively close proximity to both the exit of the preheat oven 22 and the pick-up point of the fluidized bed and transfer apparatus 26. Accordingly, as heated bottleware exits the preheat oven it is engaged by the orientation mechanism and one or more rows of bottles are realigned on conveyor 24 so that they can be properly grasped at the mentioned pickup point.

The orientation mechanism 40 includes a supporting structure 42 that is affixed either to the frame of conveyor 24 or to others of the associated apparatus fixtures. Within such structure is pivotally mounted a frame assembly 44 including end members 46 and cross pieces 48. Depending upon the conveyor width traversed it may also be necessary to reinforce at least one such cross piece as is done with channel member 50 (FIGS. 11 and 12).

As indicated frame assembly 44 is pivotally mounted to structure 42 by the bearing supports 52 and is oscillated between rearward and forward positions by fluid cylinders or first actuating means 54 that are similarly mounted on opposite sides of the conveyor to supporting structure 42. Likewise, the frame assembly is linked with the bearing supports through another set of fluid cylinders or second actuating means 56 that are adapted to vertically adjust the height of such assembly during the operational cycle of the apparatus, which is more fully described hereinafter.

Cross-pieces 48 have affixed, preferably to both sides thereof, a plurality of pusher units 58. Accordingly, such units are adapted to engage and orient two rows of ware simultaneously. In some instances, it, of course, might be equally advantageous to use only a single row of pusher units or to enlarge the frame assembly 44 to accommodate three or more rows thereof. Similarly, the number of pusher units 58 that are positioned transversely of conveyor 24 along pieces 48 may be varied to accommodate the number of bottles per row that are stacked on the conveyor.

Each pusher unit 58 is comprised of a pusher plate 60 supported on the terminal ends of two rods 62. These rods are in turn supported for vertical sliding movement in bearing mounts 64 by means of stop collars 66 and the bearing mounts are securely held in place by face plates 68.

In operation the photoelectric cell 70, or some other suitable sensing means, is arranged to detect the presence at a designated relationship of the first ware row with respect to the retracted position of frame assembly 44. Upon detection of such first row the cycle of operation is initiated resulting in the downward movement of the frame assembly so that pusher plates 60 are positioned adjacent conveyor 24 and approximately behind the ware in each row (FIG. 12). Subsequent to such downward movement due to the activation of fluid cylinders 56, fluid cylinders 54 are activated and the assembly is moved forwardly in the direction of the movement of conveyor 24. Accordingly, the ware is engaged by pusher plates 64 and in particular by the V-notches 72 formed therein (FIG. 13). The ware by moving into these notches is oriented longitudinally on conveyor 24 and due to the forward movement of the assembly is oriented laterally thereon.

After a predetermined degree of forward movement fluid cylinders 56 are again activated, this time to withdraw or retract pusher plates 60 to a position above and clear of the ware. Then, after a dwell period cylinders 54 withdraw the assembly to its initial start position. Each cylinder activation subsequent to initiation of the cycle is preferably accomplished by microswitches that are mechanically activated by the moving hardware elements. Other systems may, however, function equally well.

It should be noted at this point that each pusher unit is a wholly separate arrangement which facilitates assembly and removal thereof from the frame 44. Furthermore, a dual rod 62 arrangement is employed to: (1) accommodate the lifting of plates 60 in the event such engages a bottle on the downward movement of the frame and (2) to prevent binding in the event of such lifting. Likewise, the size of the notches 72 in plates 60 may be varied to accommodate various bottle sizes and a 40° angle of entry of such notches is preferred to assist in bottle "roll in." Another feature of units 58 is in the inclusion of shock absorbers 74 that are composed of a nylon bushing 76 which spaces apart two synthetic O-rings 78. These of course reduce noise and vibration as a pusher plate aborts an improper relationship with a bottle and rides off from that bottle and thus descends its lowermost position.

After alignment, as is above described, the ware continues to move forward with conveyor 24 and again its presence is sensed when such is in a proper position for "pick-up" by the fluidized bed and bottle transfer mechanism 26.

The fluidized bed and transfer mechanism 26 is best shown in FIGS. 2, 3 and 10 and as is evident, is supported on a vertically adjustable frame 80 by leveling legs 82. The transfer portion 84 of this mechanism is movable between three positions (A, B, C) shown in FIGS. 2 and 10 and is movable therebetween by another fluid cylinder arrangement 86 that in turn is responsive to the activation of a second sensing means 87. The basics of this structure is similar to that described in my copending applications above referenced. However, in the preferred embodiment of this invention the fluid bed 86 is retained in a fixed position on the frame 80 and chuck assembly 88 is movable toward and away from the bed at position B (FIGS. 2 and 10). This reciprocal movement is effected by means of yet another fluid cylinder arrangement 90 that is mounted on end plates 92 of the transfer portion.

As may be seen in FIG. 3 the chuck assembly 88 includes an elongated box-like structure or enclosure including side walls 94, end walls 96 and top wall 98. The bottom of this structure is uncovered but in effect is closured (bottom walled) by the clamping mechanisms 100 (FIG. 4) that are positioned along and affixed to supporting rail members 102. The interior of this enclosure is adapted for positive pressurization by means of fan 104 that forces clean air through the enclosure and out through various small bottom wall openings, below described, and principally through a top wall opening 106. This assures the exclusion of airborne thermoplastic polymer particles from deposit on the chuck assembly, which is, of course, a requirement if such particles are to be denied entry to the bottle interior or the deposit thereof on the bottle finish areas.

The above-mentioned clamping mechanisms 100 include mounting plates 108 that are positioned along rails 102 in abutting relationship with one another. Each such plate, in the preferred embodiment also includes a plurality of laterally extending elongated guide slots 110. Separate clamping members 112 are slidably positioned in each of these slots so that the opposite end portions 114 and 116 (FIG. 9) thereof project above and below plate 108, respectively. These members are further comprised of separable mating clamp segments or jaw mounting blocks 118 and 120, that form a split clamp jaw assembly. The segments are slotted at their approximate midpoint forming a post-like section to accommodate insertion into the slots and are retained therein by filler members 122.

Also in the preferred embodiment the lower portions 116 of segments 118 and 120 have separable elements 123 and 125 that are affixed thereto by fastener means, for example machine screws 124. Furthermore, these lower portions are recessed to produce cavity 126 that is sized to accept the bottle finish area 128 and which includes a surrounding lip 130 that retains and supports bottles when the segments are mated.

Each segment also has a passageway or conduit 132 extending from the periphery of the cavity through the upper portion 114 where a suitable connection 134 is provided for the interconnection of same with a fluid (air) purging and cooling gas source (not shown). The peripheral positioning of conduits 132 assures a good fluid flow along the walls of the cavity 126 with a bleeding effect between supported ware and the lip 130 when bottles are being dipped. Although there is no recognized criticality in the clearance provided between bottle finish 128 and lip 130, one-thirty-second inches on the diameter is suggested.

The fluid (air) source mentioned is adapted to provide varying volumes of fluid to segments 118, 120 during the cyclic operation thereof. Thus when the segments are separated a higher volume of air is supplied thereto to create a cooling condition. This maintains the clamping members at an operating temperature such that the thermal shocking of ware is precluded as is powder pick-up by the members. When the segments are mated for bottle retention a lower volume of air is supplied to purge the ware and bleed about the lip area 130. Air pressures and temperatures are also not critical to effective operation except as they relate to meeting the above requirements.

The lower portions 116 of clamping member segments 118, 120 are also beveled as at 136 to create a uniform flow pattern of thermoplastic polymer resin particles and purging gases around the bottle and clamping members when such are immersed in the fluid bed. Likewise, lower portions 138 have attached thereto projection means or L-shaped covers that shield the elongate openings 110 when the segments 118 and 120 are mated as shown in FIGS. 4, 6 and 9. Shielding as indicated prevents the bottom exiting of cooling air supplied to the enclosure 88 by fan 104 which if allowed to exit there would disrupt the fluid bed surface 139 (FIG. 9).

To effect the opening and closing of the clamping members 112 by the movement of separable mating clamp segments 118 and 120 there is provided for each clamping mechanism 110 two fluid cylinder actuator or activating means 140. These actuator means are positioned on and affixed to the top surface of plate 108 and thusly are positioned within enclosure 88. Furthermore, these means are connected to the clamp segments by means of piston rods 142 that engage cross members 144, which members are connected with selected ones of four supporting rails 146. Likewise, segments 118 and 120 are affixed to selected ones of rails 146 so as to move therewith. Accordingly, the like numbered segments in each row of clamping members are attached to opposite rails 146 (i.e., the outer rail on one side and the inner rail on the other side). The outer ones of such rails 146 are also center supported by bushing guides 148.

It should be noted here that the shatterproof bottle coating is applied over the majority of outside bottle surface area. However, in spite of the fact that the clamping members 112 are immersed into the fluid bed, it continues to be desirable to maintain a relatively uniform and constant bed top surface level. To accomplish this, the bed may be intermittently fed a predetermined amount of polymer particle stock after each immersion. Any suitable screw or auger, or belt type feeder may be employed and the point of actual material entry to the bed is optional. Similar, suitable measuring means is employed to dispense the proper feed stock amount from a proximately positioned storage container (none of which is shown).

The clamping members 112 will normally be in their open position until the ware becomes properly positioned for seizure at position A (FIGS. 2 and 10). Then fluid cylinders 140 will be activated by senser 87 so as to close the segments 118 and 120 and such will remain closed about the ware until it is deposited upon conveyor 30. Multiple clamping devices will, of course, be employed and will be synchronized in operation. Further, as is evident from FIGS. 5 and 7, it is preferred that each of these devices grasp at least two spaced rows of bottles at a time.

After the bottles or ware have been immersed in the fluidized bed 86 at position B to accumulate the desired resin coating thickness, the transfer mechanism retracts and removes the bottles therefrom and thereafter repositions them at the third position, C, or deposit point over the curing oven conveyor 30. Upon reaching this last position, the clamping members 112 release the coated ware and it begins its movement with the noted conveyor through oven 28. During the passage therethrough, the particulate resin coating is heated to a molten flowable state to develop a uniform coating and the desired surface texture.

From the foregoing, it should be noted that a unique process and apparatus is employed in the production of shatterproof ware. These may, of course, be used in the preparation of such ware with minor modifications depending upon the circumstances encountered without departing from the gist of the concepts herewith disclosed as well as those which may be considered inherent herein.

I claim:

1. A clamping mechanism adapted to grip an article at one end thereof such mechanism further being suitable for immersion into a first fluid medium and including a split clamp jaw assembly with at least two mating members having in recess therein of the approximate size and shape of said article one end so as to firmly grasp yet loosely surround same, a support arrangement mounting said members in juxtaposition and opposite one another, actuating means interconnected with said members to alternately move same into contact one with the other and then into said juxtaposition responsive to predetermined signal means at least one of said members further having a conduit communicating with said recess, a fluid source connected with said conduit and recess and propelling a second fluid medium therethrough in such volumes as to exclude said first medium therefrom.

2. A clamping mechanism adapted to grasp a heated hollow object and to immerse such object as well as a portion of the clamping mechanism into a fluidized bed of polymeric material and including a supporting plate positionable above and in close proximity to said fluidized bed and having at least one opening therein;

a clamp assembly mounted in said opening, a first portion thereof extending below said support plate so as to be immersed in said bed when the plate is positioned thereabove, and a second portion thereof being maintained above the support plate;

said clamp assembly first portion being comprised of a plurality of mating jaw members which are movably supported for movement toward and away from one another in said opening; said members having aligned recesses in the lowermost areas thereof of a size and shape suitable to firmly yet loosely grasp and wholly surround one end of said object; said assembly further including at least one passageway therein communicating with said aligned recesses;

means also communicating with said passageway and adapted to deliver a fluid medium in such quantities that said assembly is maintained at a temperature below the melt temperature of said polymer and is also sufficient to maintain said hollow object and member recesses under a positive pressure thereby excluding polymer therefrom; and actuator means linked with said mating jaw members and adapted to reciprocate same toward and away from one another responsive to a predetermined signal.

3. A clamping mechanism used to immerse a heated object into a fluidized bed media and adapted to grasp such object responsive to a predetermined signal and including:

an enclosure having a bottom wall with an opening therein;

actuator means and an interconnected movable linkage both mounted inside of said enclosure, said means further being rigidly affixed to said enclosure split clamp jaw members connected to said linkage for movement toward and away from one another, and the lower portion thereof extending through said opening, said members including a recess for engagement with one end of said object and having a means for conveying a fluid medium thereto whereby such recess can be positively pressurized during the immersion of said object.

4. The clamping mechanism according to claim 3 wherein said means for conveying a fluid medium to the recess in said jaw includes at least one passageway in said members having a terminal orifice opening in the recess such that fluid transmitted thereto will inpinge upon, cool and positively pressurize said members and recess.

5. The clamping mechanisms according to claim 3 wherein each of said members has attached thereto a projection means that is approximately parallel to and in juxtaposition with said bottom wall so that the openings therein are shielded when said members are abutted one with the other.

6. The clamping mechanism according to claim 4 wherein each of said jaw member includes a means for conveying a fluid medium thereto and said means includes a passage way oriented to direct a fluid stream approximately longitudinally of said member and recess.

7. The clamping mechanism according to claim 3 wherein the lower peripheral extremities of said split jaw members are tapered so that upon immersion into said fluidized bed media the upward flow of gases therethrough will be diverted outwardly toward the periphery of such members.

8. The clamping mechanism according to claim 3 wherein each of said split clamp jaw members includes a jaw mounting block having first and second portions separated by a post-like section said section is positioned in said opening such that the first portion protrudes below said bottom wall and the second portion is exposed above said wall, both said portions overlapping said plate; said linkage being connected to said second portion; and wherein said recess is formed in a clamp jaw element that is affixed to said first portion.

9. A chuck assembly adapted to grasp a plurality of heated objects simultaneously and to immerse such objects along with a portion of the chuck assembly into a fluidized bed of polymeric material and including:

a mounting plate having a plurality of parallelly arranged elongated guide slots therein;

actuator means positioned on and removably affixed to one side of said plate;

separate clamping members positioned in each of said elongated guide slots with opposite end portions thereof projecting therefrom each of said members being comprised of separable mating clamp segments, which segments are interconnected with said actuator means and are movable in response thereto toward and away from one another in said slots;

said separate clamping members further including in one end portion thereof a cavity shaped for receipt of said object so as to firmly grasp same to enable the immersion thereof as well as such end portion into the fluidized bed; and, conduit means extending through said members for communication between said cavities and a fluid source being adapted to deliver fluid in quantities sufficient to maintain said members below the melting temperature of said polymer and to generate a positive pressure within said cavities.

10. A chuck asseembly according to claim 9 wherein said separable mating clamp segments are supported on parallelly positioned movable rails that are connected to said actuator means, each of said segments being adjustably affixed to one of said rails for movement therewith.

11. A chuck assembly according to claim 9 wherein a plurality of said clamping members are supported on two parallelly positioned movable rails, the mating clamp segments of each such member being affixed to different ones of said rails, and said actuator means is connected with the rails such that a motion transfer between said means and rails will simultaneously move the rails and segments in opposite directions.

12. A chuck assembly according to claim 11 wherein said actuator means is comprised of a plurality of fluid cylinders operatively interrelated to effect the simultaneous movement of said rails.

13. A chuck assembly according to claim 9 wherein said conduit means are positioned in each of said segments and open to the cavities proximate the perimeters thereof.

14. A chuck assembly according to claim 9 wherein each of said segments have attached thereto projections that are approximately parallel to and in juxtaposition with said plates so that the elongated guide slots therein are shielded when said segments are in a mating relationship.

* * * * *